Oct. 4, 1960 P. I. WYNDHAM 2,955,237
FAULT INDICATING CIRCUITS
Filed July 1, 1957
2 Sheets-Sheet 1
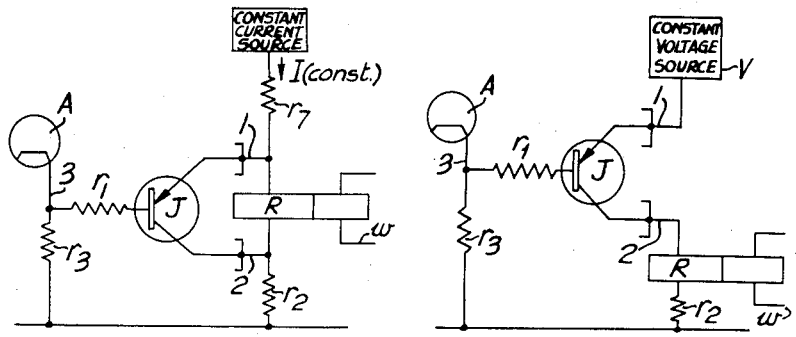
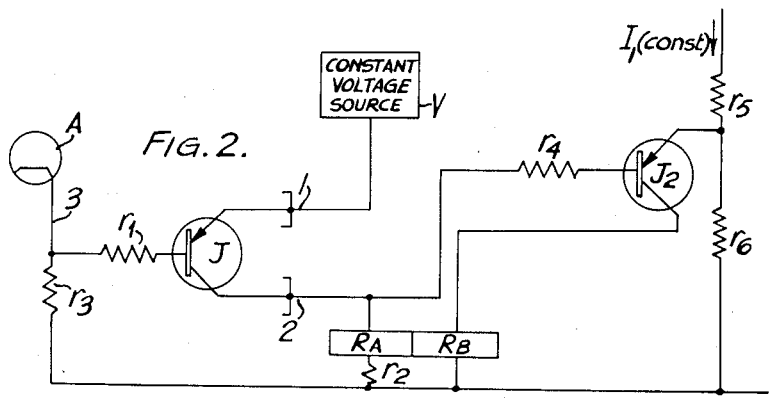
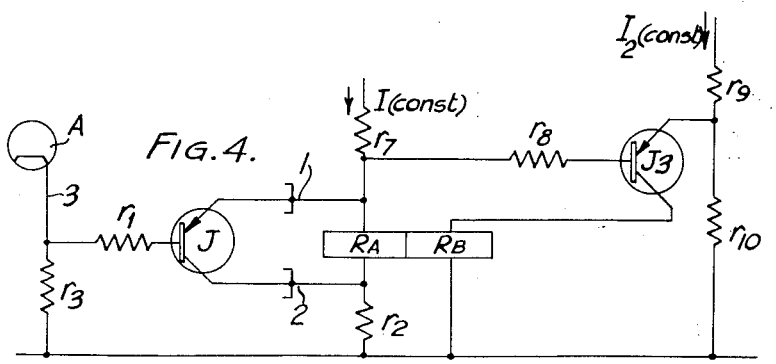
INVENTOR
PAUL IAN WYNDHAM
BY Irwin S. Thompson
ATTY.

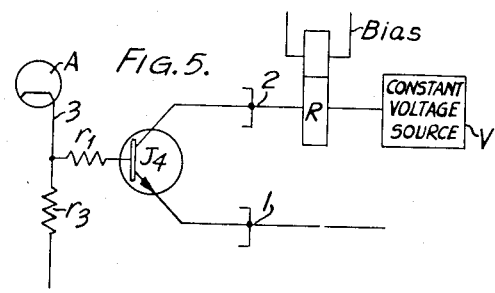
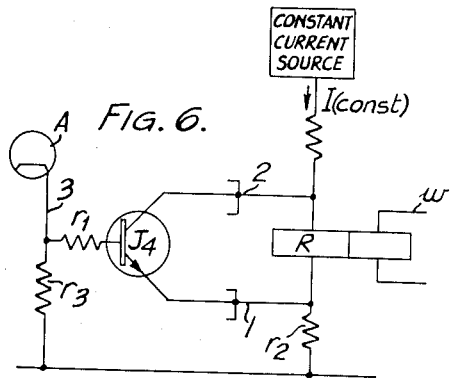
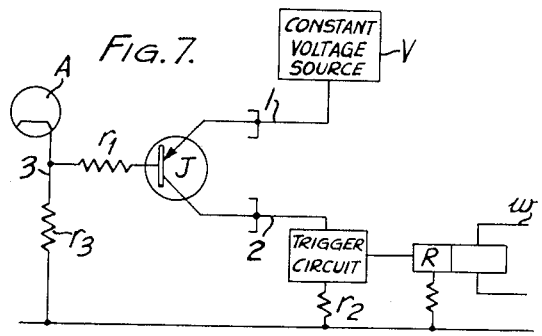

United States Patent Office 2,955,237
Patented Oct. 4, 1960

2,955,237

FAULT INDICATING CIRCUITS

Paul I. Wyndham, St. Pauls Cray, England, assignor to Telephone Manufacturing Company Limited, London, England, a British company Filed July 1, 1957, Ser. No. 669,315

Claims priority, application Great Britain July 13, 1956

7 Claims. (Cl. 317—148.5)

The invention relates to fault indicating circuits and is especially adaptable to electrical installations employing a large number of similar valve circuits for example the terminal equipment of multiplex carrier telecommunication systems, where it is important to obtain an automatic indication or response to the failure of any one circuit. The invention is, however, capable of general application to any electrical apparatus where a rising or falling voltage is to be monitored in a number of circuits.

One of the objects of the present invention is to provide an efficient and inexpensive fault indicating system which shall be more sensitive than the systems previously available in comparable situations.

According to this invention a fault indicating circuit for a plurality of electrical devices comprises a source of current and a current-responsive fault indicating means common to all of the said electrical devices and a transistor individual to each electrical device connected between the corresponding electrical device under test and arranged to operate as a current amplifying device upon the occurrence of a fault potential in the respective electrical device under test, and the amplified current changes the condition of the current-responsive fault indicating means. Such change in condition may consist in an increase in current, or in appropriate cases a decrease in current through the current responsive device, as will be further explained below. Each transistor is connected to the common fault indicating means by a common test conductor, and it may be arranged that the said common test conductor remains at constant voltage when the current changes to give the fault indication.

More specifically, the fault indicating circuit according to the invention for a plurality of electrical devices may comprise a source of current and a current-responsive fault indicating means common to all of the said electrical devices, and a transistor individual to each electrical device connected between the latter and the common fault indicating means, the arrangement being such that the occurrence of a fault potential at an individual one of said electrical devices causes flow of current through a junction of the corresponding transistor between electrodes which are remote from the fault potential.

Considering now a typical case of an installation having a number of similar valve circuits each of which is to be monitored for failure, such failure being represented by a positive or negative change in potential at a point in the cathode circuit, two basic arrangements are included within the invention:

(a) Employing a transistor junction as a switch in series with a source of voltage and an alarm relay or other fault indicating device.

(b) Employing a transistor junction to partially short-circuit a current-responsive fault indicating device, such as an alarm relay.

Examples of each of these arrangements are shown in the accompanying simplified diagrams, wherein:

Fig. 1 shows a series type of circuit giving a "fail" alarm for a fall in potential;

Fig. 2 shows a circuit similar to Fig. 1, with an additional transistor arranged to increase the fault sensitivity;

Fig. 3 shows a shunt type of circuit giving a "fail" alarm for a fall in potential;

Fig. 4 shows a circuit similar to Fig. 3, with an additional transistor to increase the fault sensitivity;

Fig. 5 shows a series type of circuit giving a "fail" alarm for a rise in potential;

Fig. 6 shows a shunt type of circuit giving a "fail" alarm for a rise in potential;

Fig. 7 shows a further modification of the circuit of Fig. 1.

Referring now to Figure 1 which is an example of the first arrangement (a) one p-n-p transistor J is allotted to each valve A and has its base electrode connected to an appropriate point of the cathode circuit through the series base resistor $r_1$. The emitters of all the transistors are connected through a common conductor to the positive pole of a source of constant voltage V, and the collector electrodes are connected in common to one terminal of the main winding R of an alarm relay, the other terminal of the relay being connected through a resistor $r_2$ to the negative pole of the supply voltage. The common connecting points of the emitters and collectors are indicated by the usual symbol and are numbered 1 and 2 respectively. $r_3$ is a cathode series resistor. The relay is provided with a suitably designed bias winding $w$. The potential at the common conductor 1 connected to the emitter junctions is maintained at a level sufficiently below that of point 3 of the valve cathodes, under normal conditions, to reverse bias all the emitter-base junctions and to block the emitter-collector junctions. For example the cathodes of the valves may normally be at 2 volts and the emitter common point 1 at 1 volt. Under these conditions the main relay winding is not operative. Under a fault condition of any one valve the cathode potential drops to zero, thus forward biasing the respective emitter-base junction and opening the emitter-collector junction to flow of current and so causing current to energise the adjoining main winding R of the relay, which overcomes the effect of the bias winding $w$, whereupon the relay operates an alarm in a known manner. The transistor emitter-collector circuit is driven into the saturation condition of high current and low voltage, but this change is gradual rather than instantaneous, the current in the bias winding remaining constant during this time. Whilst this action is sufficiently rapid for many purposes a flip-flop type of action may in some cases be desirable and is, in any case, preferably for relay purposes, e.g. to ensure adequate contact pressures.

In order to increase the sensitivity an arrangement may be used, such as shown in Figure 2, to decrease the bias on the relay as the main relay winding becomes progressively more effective. Such an inverse biasing arrangement may, in addition to the arrangement first described in Figure 1 comprise an additional p-n-p transistor $J_2$ common to all the circuits under test, this additional transistor having its series base resistor $r_4$ connected to the common point 2 of the collectors of the respective transistors at one terminal of the main winding $R_A$ of the relay, whilst the emitter-collector junction of this additional transistor is connected in series with the bias winding $R_B$ of the relay. The emitter of the additional transistor is connected to a source of constant current $I_1$, resistors $r_5$ and $r_6$ being included to obtain the proper potentials in the transistor junctions. The emitter-collector is normally conducting due to forward biasing of its emitter-base junction, and so a current flows through the biasing winding $R_B$. Upon occurrence of a fault, the potential of the common point 2 of the collectors of the transistors $J_1$ rises sufficiently to reverse bias the additional transistor $J_2$. Under these conditions the current through the bias winding $R_B$ will fall as the current through the main winding rises and this differential effect will make fault detection a more rapid operation.

For the second arrangement (b) which is illustrated in Figure 3, p-n-p transistors may again be used, one being alotted to each valve A and connected to the appropriate point 3 of the cathode circuit through a series base resistor $r_1$ as before. The emitters of all the transistors are connected through a common conductor 1 to one terminal of the main winding R of an alarm relay, and the collector electrodes are connected through a second common conductor 2 to the other terminal of the winding. A source of constant current is connected in series with these common points and with the relay, with respect to which all of the transistor emitter-collector junctions are in shunt. The relay is provided with a bias winding $w$ and $r_2$ and $r_7$ are resistors of low value compared with that of the emitter-collector junction. The arrangement is such that the relay main winding R is under normal conditions energised by a current I from the constant current source, the potential at the common point 1 of the emitter junctions being maintained at a level sufficiently below that of the valve cathodes to reverse bias all the emitter-base junctions and to block the emitter-collector junctions. For example point 3 of the cathode circuit may normally be at 2 volts and the common point 1 of the emitters at 1 volt. Under a fault condition at one valve the cathode potential drops to zero, thus forward biasing the respective emitter-base junction and opening the emitter-collector junction to flow of current. The resistance of this junction is so chosen with respect to that of the relay main winding R, and to the amount of bias applied thereto by the winding $w$ that the current through the main winding is reduced sufficiently to release the relay, which action may operate an alarm in a known manner.

As with the previously described arrangement of Figure 1, the sensitivity may be increased by use of an additional transistor, an example of which is shown in Figure 4. This transistor $J_3$ will however, in this case have its base electrode connected via a resistor $r_8$ to the common point 1 of the emitters. The emitter-collector junction of $J_3$ is connected in series with a source of constant current $I_2$, resistors $r_9$ and $r_{10}$ being included to establish the correct biasing potentials. Similarly as in the Figure 3 circuit, transistor J has its base-emitter junction back biased so that the emitter-collector junction is normally blocked. In Figure 4 the emitter-base junction of transistor $J_3$ is just back-biased so that zero current flows in the collector circuit in series with the biasing winding $R_B$ of the relay. Upon occurrence of a fault, the emitter-collector junction of transistor J becomes conducting and is driven into the saturation condition of low resistance, the main winding $R_A$ becoming progressively less effective due to the shunting action of transistor J. At the same time the potential of point 1 falls sufficiently to allow current through the emitter-collector junction of $J_3$ and through the biasing winding $R_B$ to increase from zero and to accelerate the release of the relay.

Where a rising potential is to be detected a basically similar arrangement can be used by substituting n-p-n for p-n-p transistors. Examples of such circuits are shown in Figures 5 and 6 where the n-p-n transistor is indicated by $J_4$ and the remaining references correspond to those used in Figures 1 and 3. In Figure 5 which shows the series type of circuit modified for detecting a rising potential, the point 3 of the cathode circuit is assumed to be normal at 2 volts potential and to fail at 4 volts, in which case the common emitter junction 1 of the transistors is maintained at a potential of say 3 volts under normal and fault conditions. Upon the occurence of a rise in voltage at point 3 of the cathode circuit the emitter-collector junction of the transistor becomes conductive and the relay is operated.

In the shunt type of circuit shown in Figure 6 the common emitter junction 1 of the transistors is maintained at say 3 volts under normal and fault conditions, the potentials in the cathode circuit being assumed to be the same as in Figure 5. Operation of the circuit upon a rise in voltage at the cathode is similar to that already described in Figure 3 for a fall in voltage at the cathode.

The series type of circuit first described is more sensitive and resets to normal condition earlier than the shunt type of circuit. However, the series type of circuit is more subject to the effects of collector back leakage current than is the shunt circuit. If say twenty four valve circuits are under test in circuits such as Figures 1 and 2 the total leakage current in the collector circuit at zero emitter current from the paralleled junctions is fed to the relay and may be appreciable, since it increases with temperature. In the shunt type of circuit the collector back leakage current by-passes the relay through a resistor, and since the relay and transistor are supplied from a constant current source the effect of the leakage current is not such a critical factor in design.

As already stated the circuits give a gradual rather than a sudden fault indication due to the characteristics of the transistor junctions when being driven into the high current and low voltage, i.e. low resistance condition. To obtain greater contact pressures, and hence more efficient relay operation, it may be desirable, in some applications, instead of, or in addition to the additional transistor of Figures 2 and 4, to interpose a flip-flop type of circuit between the transistor and the relay as indicated in the modified circuit of Figure 7 and to arrange for the transistor to trigger this circuit and so to obtain a quicker operation of the relay.

I claim:

1. A monitoring arrangement comprising in combination a plurality of test points which are normally maintained at a predetermined potential, a like plurality of p-n-p transistors respectively associated with each of said test points, a like plurality of resistors included respectively between the test points and the bases of the associated transistors, a relay common to all said transistors, a constant voltage source, connections from the positive pole of said source to the emitters of all said transistors, connections from the collectors of all said transistors to one terminal of said relay and a connection from the other terminal of said relay to the negative pole of said source whereby if the potential of any one of said test points falls sufficiently the associated transistor conducts and effects the operation of said relay without affecting the potential of any other of said test points.

2. A monitoring arrangement comprising in combination a plurality of test points which are normally maintained at a predetermined potential, a like plurality of p-n-p transistors respectively associated with each of said test points, a like plurality of resistors included respectively between the test points and the bases of the associated transistors, a relay common to all said transistors, a constant current source, a common resistor, connections from the positive pole of said source by way of said common resistor to the emitters of all said transistors and to one terminal of said relay, and connections from the collectors of all said transistors and the other terminal of said relay to the negative pole of said source whereby if the potential of any one of said test points falls sufficiently the associated transistor conducts and shunts said relay to cause it to release without affecting the potential of any other of said test points.

3. A monitoring arrangement comprising in combination a plurality of test points which are normally maintained at a predetermined potential, a like plurality of n-p-n transistors respectively associated with each of said test points, a like plurality of resistors included respectively between the test points and the bases of the associated transistors, a relay common to all said transistors, a constant voltage source, a connection from the positive pole of said source through the winding of said relay to the collectors of all said transistors, and connections from the emitters of all said transistors to the negative pole of said source, whereby if the potential of any one of said test points rises sufficiently, the associated transistor conducts and effects the operation of said relay without affecting the potential of any other of said test points.

4. A monitoring arrangement comprising in combination a plurality of test points which are normally maintained at a predetermined potential, a like plurality of n-p-n transistors respectively associated with each of said test points, a like plurality of resistors included respectively between the test points and the bases of the associated transistors, a relay common to all said transistors, a constant current source, a common resistor, connections from the positive pole of said source by way of said common resistor to the collectors of all said transistors and to one terminal of said relay, and connections from the emitters of all said transistors and the other terminal of said relay to the negative pole of said source whereby if the potential of any one of said test points rises sufficiently, the associated transistor conducts and shunts the relay to cause its release without affecting the potential of any other of said test points.

5. A monitoring arrangement comprising in combination a plurality of test points which are normally maintained at a predetermined potential, a like plurality of p-n-p transistors associated respectively with said test points, a like plurality of resistors included respectively between the test points and the bases of the associated transistors, a relay provided with first and second windings connected in opposition, a constant voltage source, connections from the positive pole of said source to the emitters of all said transistors, connections from the collectors of all said transistors to one terminal of said first winding of said relay, a connection from the other terminal of said first winding to the negative pole of said source whereby said first winding is energised due to the conduction of any one of said transistors when the potential of the associated test point falls sufficiently, a further p-n-p transistor, a resistor connected between the base of said further transistor and said one terminal of said first winding of said relay, a constant current source, a pair of resistors connected in series across said constant current source, a connection from the emitter of said further transistor to the junction point of said pair of resistors, the collector of said further transistor being connected in series with said second winding to the negative pole of said constant current source whereby when said first winding is energised said further transistor cuts off the current flow through said second winding, thereby causing the more rapid operation of said relay.

6. A monitoring arrangement comprising in combination a plurality of test points which are normally maintained at a predetermined potential, a like plurality of p-n-p transistors associated respectively with said test points, a like plurality of resistors included respectively between the test points and the bases of the associated transistors, a relay provided with first and second windings connected in opposition, a first constant current source, a first common resistor, connections from the positive pole of said first constant current source by way of said first common resistor to the emitters of all said transistors and to one terminal of said first winding of said relay, connections from the collectors of all said transistors and the other terminal of said first winding to the negative pole of said first constant current source whereby said first winding is shunted due to the conduction of any one of said transistors when the potential of the associated test point changes sufficiently, a further p-n-p transistor, a second common resistor connected between the base of said further transistor and said one terminal of said first winding of said relay, a second constant current source, a pair of resistors connected in series across said second constant current source, a connection from the emitter of said further transistor to the junction point of said pair of resistors, the collector of said further transistor being connected in series with said second winding to the negative pole of said second constant current source whereby when said first winding is shunted said further transistor conducts and energises said second winding, thereby causing the more rapid release of said relay.

7. A monitoring arrangement comprising in combination a plurality of test points which are normally maintained at a predetermined potential, a like plurality of p-n-p transistors respectively associated with each of said test points, a like plurality of resistors included respectively between the test points and the bases of the associated transistors, a trigger circuit common to all said transistors, a relay controlled by said trigger circuit so as to be operated responsive to the operation of said trigger circuit, a constant voltage source, connections from the positive pole of said source to the emitters of all said transistors, connections from the collectors of all said transistors to one terminal of said trigger circuit and a connection from the other terminal of said trigger circuit to the negative pole of said source whereby if the potential of one of said test points changes sufficiently, the associated transistor conducts and causes the operation of said trigger circuit without affecting the potential of any other of said test points, said trigger circuit then effecting the rapid and reliable operation of said relay.

References Cited in the file of this patent
UNITED STATES PATENTS

| | | |
|---|---|---|
| 2,678,418 | Black | May 11, 1954 |
| 2,828,450 | Pinckaers | Mar. 25, 1958 |